United States Patent
Chen

(10) Patent No.: US 9,984,189 B2
(45) Date of Patent: May 29, 2018

(54) DATA CLOCKED RETIMER MODEL

(71) Applicant: International Business Machines Corporation, Armonk, NY (US)

(72) Inventor: Zhaoqing Chen, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 93 days.

(21) Appl. No.: 15/047,152

(22) Filed: Feb. 18, 2016

(65) Prior Publication Data

US 2017/0242947 A1 Aug. 24, 2017

(51) Int. Cl.
*G06F 17/50* (2006.01)

(52) U.S. Cl.
CPC .................. *G06F 17/5036* (2013.01)

(58) Field of Classification Search
CPC .................. G06F 17/5086; G06F 17/5036
See application file for complete search history.

(56) References Cited

U.S. PATENT DOCUMENTS 6,515,486 B1 * 2/2003 Nguyen ............. G01R 31/30
324/615
6,937,971 B1 * 8/2005 Smith ................ G06F 17/5036
703/18

OTHER PUBLICATIONS

Agilent Technologies, "Characterizing Your PLL-based Designs to Manage System Jitter", Agilent Technologies, Mar. 2008, 18 pages.
Baprawski, John, "Using AMI Retimer Models in ADS ChannelSim", Agilent Technologies, Jan. 23, 2012, 15 pages.
Chen, Zhaoqing, "Decision Feedback Equalizer (DFE) Behavioral Macro Model for Packaging System Eye Diagram Transient Simulations", IBM, IEEE, 2011, 8 pages.
Chen, Zhaoqing, "Receiver Macro Modeling Including DC, Filter, and Preamplifier Nonlinear Properties for Packaging System Transient Simulations", IBM, IEEE, Electronic Components and Technology Confernce, 2010, 8 pages.
Haur et al.,"IBIS AMI Modeling of Retimer and Performance Analysis of Retimer based Active Serial Links" DesignCon, 2014, 22 pages.
IDT,"PCI Express Reference Clock Requirements" Integrated Device Technology, An-843, Revision A May 12, 2014, 25 pages.
Katz et al., "Modeling Analog Repeaters in IBIS-AMI", SiSoft, Feb. 3, 2011, 12 pages.
Li, et al.,"Transfer Functions for the Refence Clock Jitter in a Serial Link: Theory and Applications", ITC International Test Conference, IEEE, 2004, 10 pages.
List of IBM Patents or Patent Applications Treated as Related; Date File: Feb. 18, 2016, pp. 1-2.

(Continued)

*Primary Examiner* — Vuthe Siek
(74) *Attorney, Agent, or Firm* — Cantor Colburn LLP; Margaret A. McNamara

(57) ABSTRACT

A method of analyzing a transient response of an electronic circuit is includes: forming a model of a retimer that includes a data clocked latch; providing a latch input signal at the input of the model; forming an output signal based on the latch input signal with the voltage controlled voltage source, wherein the voltage controlled voltage source provides a high output when the latch input signal passes through a low to high transition value and continues to provide the high output until the latch input signal passes through a high to low transition value.

20 Claims, 5 Drawing Sheets

(56) References Cited

OTHER PUBLICATIONS

Rao et al., "Analysis of Jitter-Induced Voltage Noise in Clock Channels", IEEE Transactions on Electromagnetic Compatibility, vol. 57, No. 4, Aug. 2015 pp. 788-795, 8 pages.
Rao et al., "Frequency Domain Analysis of Jitter Amplification in Clock Channels", in Proc.,2012, EPEPS, pp. 51-54, 4 pages.
Silicon Labs,"PCI Express 3.0 Jitter Requirements", AN562, rev. 1, Dec. 2010, 24 pages.
Texas Instruments, DS100DF410,"DS100DF410 Low Power 10GbE Quad Channel Retimer", SNLS399B, Jan. 2015, 57 pages.
Zhaoqing Chen, "A Single-Ended-Mode to Mixed-Mode Transformer Spice Circuit Model for High-Speed System Signal Integrity Simulations", U.S. Appl. No. 15/047,002, filed Feb. 18, 2016.
Zhaoqing Chen, "Behavioural Circuit Jitter Model", U.S. Appl. No. 15/047,011, filed Feb. 18, 2016.
Zhaoqing Chen, "Reference Clocked Retimer Model", U.S. Appl. No. 15/047,143, filed Feb. 18, 2016.

\* cited by examiner

DATA CLOCKED RETIMER MODEL

BACKGROUND

The present invention relates to electronic circuits, and more specifically, to systems and methods for designing and analyzing the transient response of an electronic circuit.

Advances in the field of computer and electronic system design continue to drive and facilitate greater processing efficiencies. Through modeling and other analysis, electronic files containing designs for electronic circuits and computer systems are optimized for use as templates for hardware manufacturing and networking.

A typical computer/circuit design file includes text that accounts for numerous electronic hardware components. For example, a file containing a design commonly includes programmatic objects and identifiers descriptive of busses, microchips, expansion cards and other system hardware. A bus generally enables selective communication between a computer processor unit (CPU) and one or more components, such as those mounted on an expansion card. A typical bus, such as a Peripheral Component Interconnect or Industry Standard Architecture bus, may additionally couple to a main system circuit board. Expansion cards are typically thin, rectangular printed circuit boards that have connector pins along one edge that couple to corresponding sockets of the bus. Programmatic objects describing such components within the design file may include delay, routing, voltage, resistance, symbol and/or other parameter data.

In operation, actual components of a circuit cooperate to process electronic signals according to system requirements. More particularly, the components interconnect to generate and communicate electronic signals. Different combinations and configurations of components affect system performance. For example, component layout can impact system timing. System timing regards the arrival of a signal at a given component within a predetermined window of time. Each component visited along the path of a signal introduces varying delay that affects the time required for the signal to reach a destination component. Thus, successful timing requires coordination with other signals and signal paths to ensure coordinated system processing. Failure to achieve desired timing can result in processing delays, error and failure. For instance, a system function that conjunctively processes multiple signals cannot complete its processing until the last of the signals arrives. Thus, the function can be unduly delayed or altogether frustrated should an unacceptable amount of time lapse while waiting for the last of the signals to arrive. For example, delays may cause race conditions, where a process may shutdown altogether in response to a late signal.

Another performance factor affected by system design is noise. Noise is characterized as static or interference introduced as the signal travels through system components and connections. As such, the electrical characteristics of the signal change as it propagates through a system. For instance, square wave characteristics of an input signal may become less distinct due to loss dispersion encountered in a system. While some tolerance of noise is typically built into a system design specification, unacceptable noise levels can severely impact signal clarity and system performance. For example, data may become corrupted, e.g., a binary "1" may register as a "0."

Production of a hardware system represents a substantial investment of material, manpower and other economic resources. Consequently, it is advantageous to verify design integrity prior to committing it to hardware. More particularly, it is desirable to predict or otherwise analyze performance characteristics of a design prior to implementation. To this end, simulation programs, or engines, have been developed to model performance of the programmatic objects of a design. Such modeling practices help to assure conformity with system needs.

SUMMARY

According to an embodiment of the present invention, a method of analyzing a transient response of an electronic circuit is disclosed. The method includes: forming a model of a retimer, the model including a data clocked latch that includes an input and an output, the input being coupled to ground through an input impedance and the output including a voltage controlled voltage source having positive and negative terminals, the negative terminal being coupled to ground through an output impedance and the positive terminal being connected to the output; providing a latch input signal at the input; forming an output signal based on the latch input signal with the voltage controlled voltage source, wherein the voltage controlled voltage source provides a high output when the latch input signal passes through a low to high transition value and continues to provide the high output until the latch input signal passes through a high to low transition value.

According to another embodiment, a computer program product comprising a computer readable storage medium having program instructions embodied therewith is disclosed. The program instructions are executable by a processor chip to cause the processor chip to analyze a transient response of an electronic circuit by: forming a model of a retimer, the model including a data clocked latch that includes an input and an output, the input being coupled to ground through an input impedance and the output including a voltage controlled voltage source having positive and negative terminals, the negative terminal being coupled to ground through an output impedance and the positive terminal being connected to the output; providing a latch input signal at the input; forming an output signal based on the latch input signal with the voltage controlled voltage source, wherein the voltage controlled voltage source provides a high output when the latch input signal passes through a low to high transition value and continues to provide the high output until the latch input signal passes through a high to low transition value.

According to another embodiment, a system for analyzing a circuit is disclosed. The system includes a signal source and a model of a retimer, the model including a data clocked latch that includes an input connected to the signal source and an output, the input coupling the signal source to ground through an input impedance and the output including a voltage controlled voltage source having positive and negative terminals, the negative terminal being coupled to ground through an output impedance and the positive terminal being connected to the output. The model forms an output signal based on the signal source with the voltage controlled voltage source, wherein the voltage controlled voltage source provides a high output when the latch a signal received from the signal source passes through a low to high transition value and continues to provide the high output until the latch input signal passes through a high to low transition value.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As mentioned above, ensuring correct timing in circuits is important. Retimers are more and more widely used in high speed server systems including on-board and embedded-incable-connector applications to help ensure timing. A retimer consists of a complete receiver and a driver which are synchronized by clocks from either recovered from a data stream by a CDR (clock and data recovery) unit or a reference clock net. For example, a retimer may be present on both ends of a transmission line that forms part of a SerDes (Serializer/Deserializer).

Retimers are non-linear and time-variable active devices. At present, modeling of such retimers has proven difficult. For example, as retimers are non-linear, modeling based on S-parameter models is not effective. Further, transistor level model of retimers are too complex for regular signal integrity simulations.

Currently, the input/output buffer information specification-algorithmic modeling interface (IBIS-AMI) retimer model has been applied in industry for signal integrity simulations. However, the current modeling and signal integrity simulation method for including retimers are not straight-forward are require a piping simulation method only supported by some specific simulation tools. Thus, they are not general-purpose transient simulation tools which can deal with most nonlinear device models.

Herein disclosed is a model that can be used to model a data clocked retimer. In particular, the model determines a clock for setting an output signal based on one or both the rising and falling edges of the received data. The model may be implemented in a behavioral circuit modeling program. SPICE (Simulation Program with Integrated Circuit Emphasis), HSPICE, and POWERSPICE are examples of such programs.

In some cases herein, the circuit model will be shown as providing a so-called "eye" diagram. It shall be understood that the signal could be different but for testing purposes eye diagram have proved useful.

The retimer may be based off a single building block or may include other blocks that allow for more accurate retimer modeling. The main block is shown in FIG. 1 and will be referred to herein as a data triggered latch.

Figure 1:
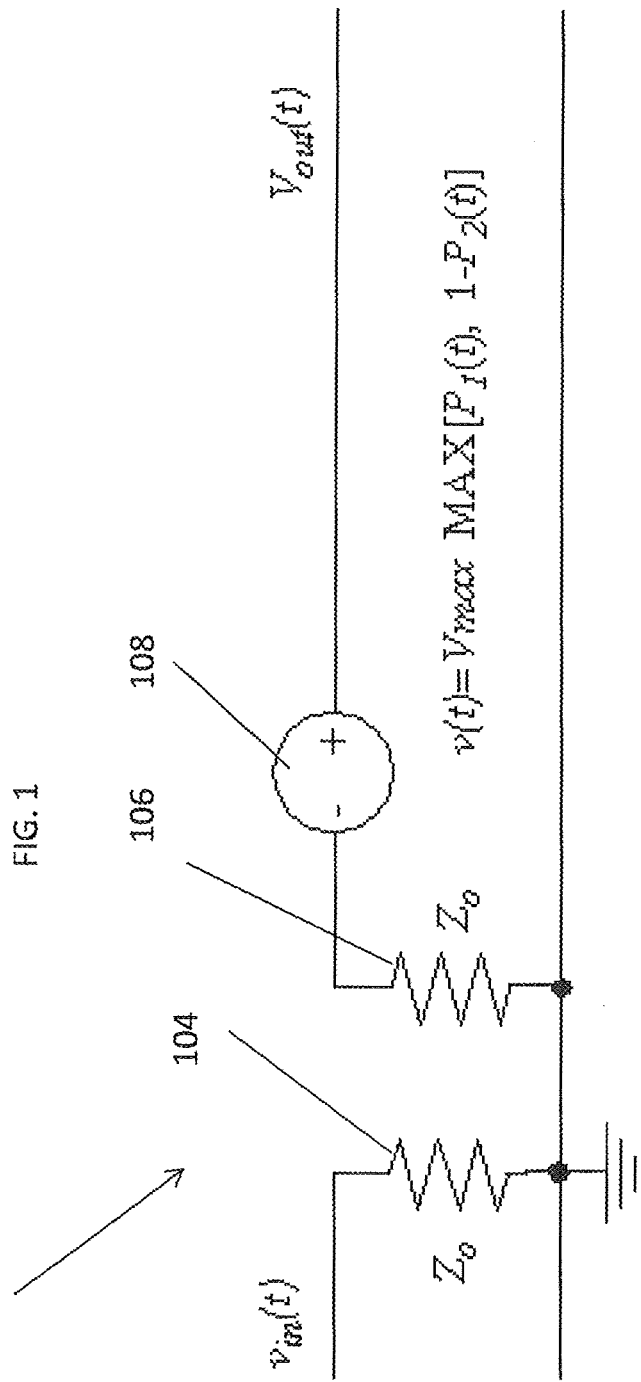
FIG. 1 is a simplified of a data triggered latch model according to one embodiment.
Figure 2:
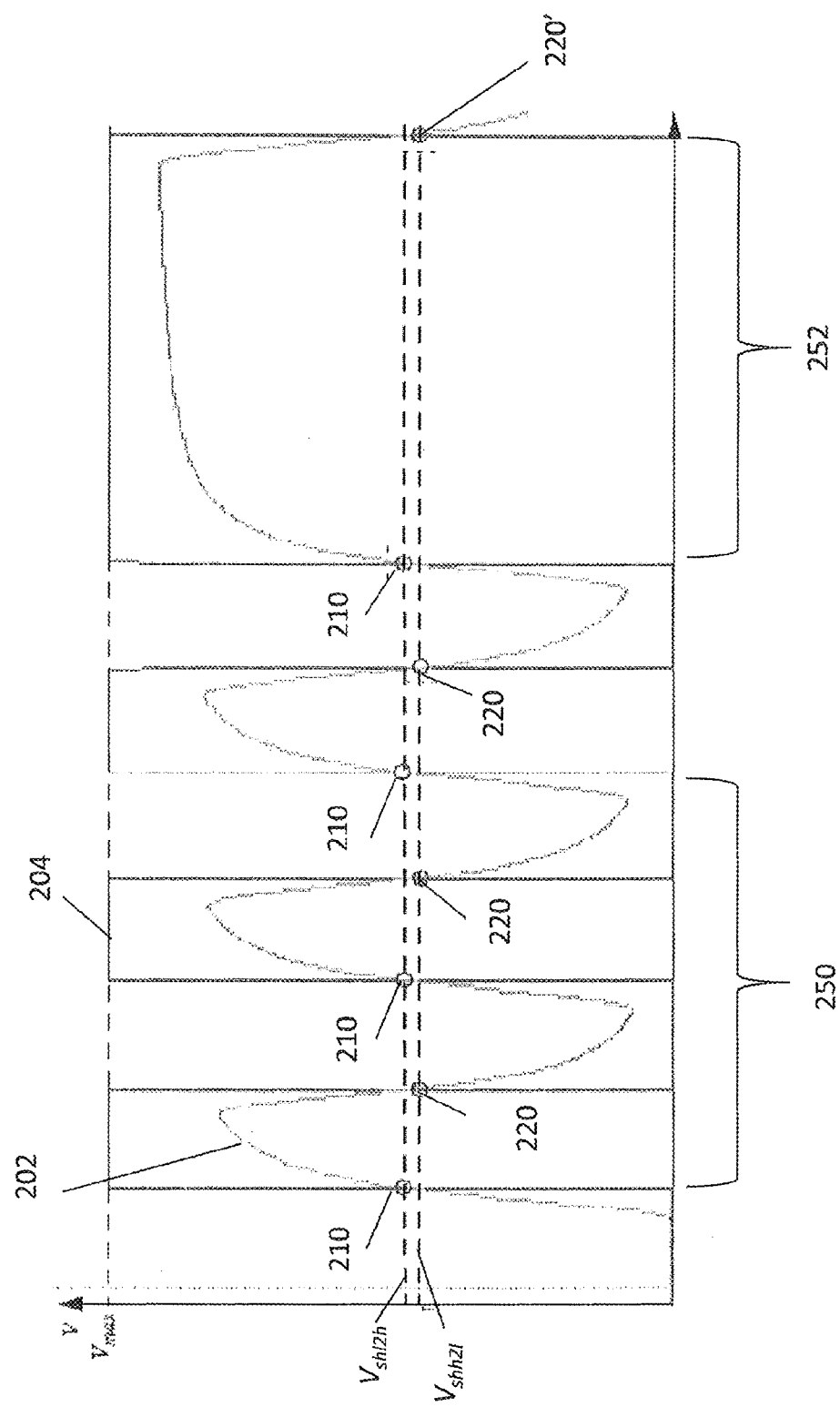
FIG. 2 is a graph showing the input and output of the data triggered latch of FIG. 1 according to one embodiment.

As illustrated, the data triggered latch 102 of FIG. 1, receives an input signal $v_{in}(t)$ and outputs $v_{out}(t)$. With reference now to FIG. 2, trace 202 represents an example of signal $v_{in}(t)$. The model shown in FIG. 1 may include two different threshold values that cause the latch to "switch" states. The threshold values are shown in FIG. 2 as switching voltages $V_{shl2h}$ (low-to-high) and $V_{shh2l}$ (high-to-low). As shown, $V_{shl2h}$ a little higher than $V_{shh2l}$. This is not required but may help ensure stability of the model output waveform by avoiding possible unexpected short impulse during the voltage level transitions. In FIG. 2, each time $v_{in}(t)$ passes through $V_{shl2h}$ (from below; shown by circled events 210), $v_{out}(t)$ (trace 204) transfers from a low state to a high state. Similarly, each time $v_{in}(t)$ passes through $V_{shh2l}$ (from above; shown by circled events 220), $v_{out}(t)$ (trace 204) transfers from a high state to a low state.

In this case, the high state is generally shown as $V_{max}$ and the low state is shown as 0. Of course, in the case of differential input signal, the low state could be the opposite Vmax. As will be understood, the output of the latch 102 may be a variable duty square wave that follows the values of input signal. For example, for periodic changes of $v_{in}(t)$ the output $v_{out}(t)$ is simply a well-defined forced amplitude square wave as shown in region 250. In region 252, the input signal remains high for a longer time period so $v_{out}(t)$ remains high until the inputs signal falls below $V_{shh2l}$ (e.g., at crossing 220'). In this manner, the average rising or falling (or both) edges of input signal will determine the "clock output" of the retimer.

With reference again to FIG. 1, the model includes an input impedance 104 and an output impedance 106 both connected to ground. These impedances are shown as having value $Z_0$ which may be selected based on the particular context and is 100 ohms in one embodiment. The output impedance 106 is connected to a voltage controlled voltage source 108. That source, in combination with output impedance 106 defines $v_{out}(t)$.

In the above, 4 input parameters have been defined, $V_{shl2h}$, $V_{shh2l}$, $V_{max}$, and $Z_0$. The model accepts these as inputs and generates the voltage signal based of the source 108 based on the following equations:

$$v_{out}(t) = V_{max} * \text{MAX}[P_1(t), 1 - P_2(t)] \quad (1).$$

As can be seen, $v_{out}(t)$ will vary between to values, $V_{max}$ times either $P_1(t)$ or $1-P_2(t)$. As shown below, $P_1(t)$ or $1-P_2(t)$ vary between two and only two values based on comparisons of the input signal to the switching voltages $V_{shl2h}$ and $V_{shh2l}$. In particular:

$$P_1(t) = (0.5 + 0.5 * \text{SGN}(v_{in}(t) - V_{shh2l})) * (1 - P_2(t); \text{ and} \quad (2)$$

$$P_2(t) = 0.5 + 0.5 * \text{SGN}(V_{shl2h} - v_{in}(t)) \quad (3)$$

where SGN (X) is 1 for x>0, −1 for x, 0 and 0 for x=0. The 0.5 factors for used in the above equations ensure that cases where negative input values may be accounted for while still also allowing for input values to vary only from 0 to 1. Of course, the 0.5 factors could be replaced with other constants depending on the context.

Figure 3:
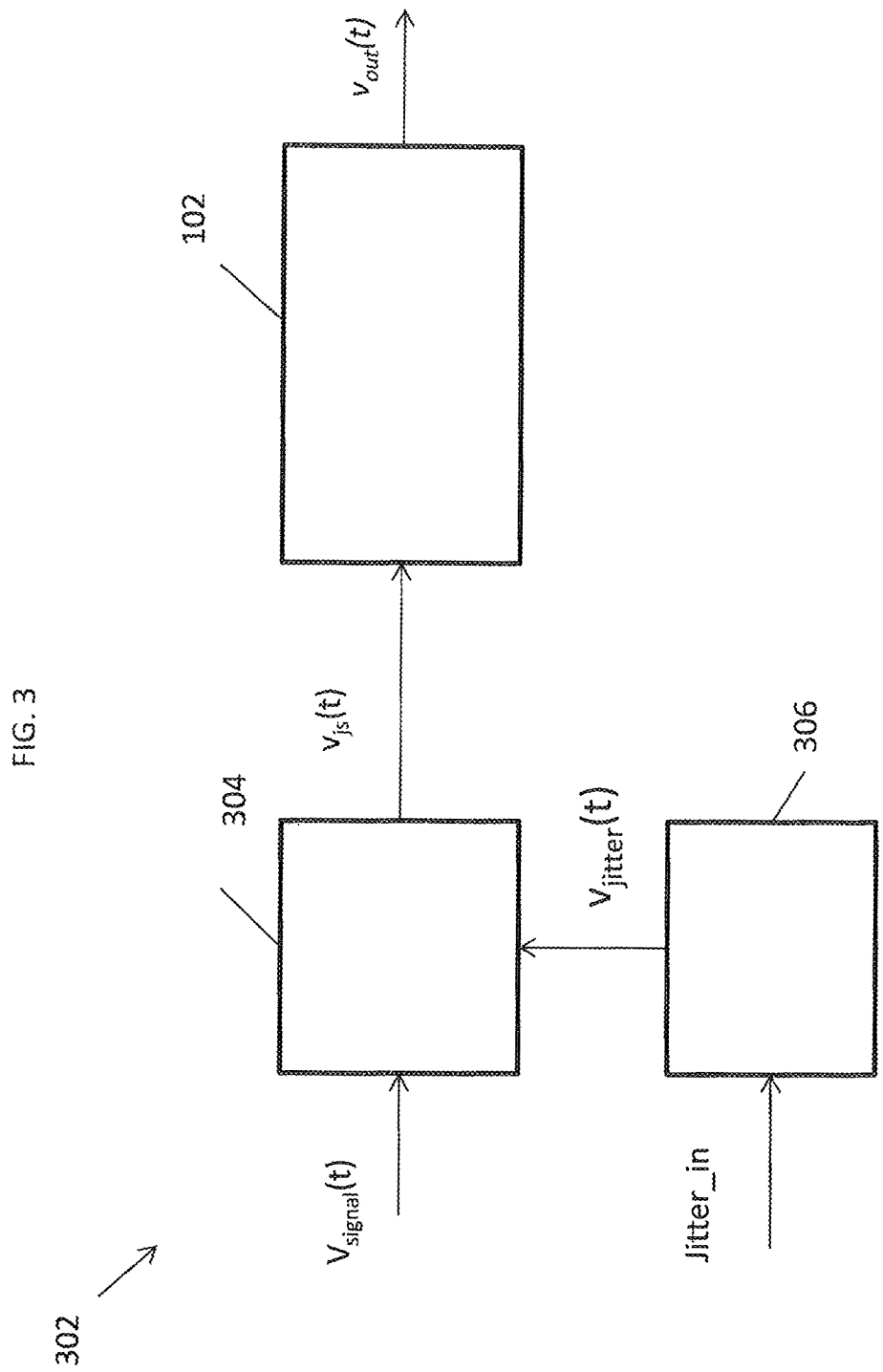
FIG. 3 is block diagram of a retimer model according to one embodiment.

The above described latch 102 may serve, in one embodiment, as a stand-alone retimer model. In another embodiment, jitter may be injected into the model to produce a more expansive model 302 as shown in FIG. 3. This model Includes the data triggered latch 102 described above. In this model, the input to the data triggered latch 102 may be altered to account for jitter and, as such, includes a jitter modulator 304. The jitter modulator 304, in short, modulates a jitter effect on a circuit onto the input signal ($v_{signal}(t)$) to produce a jittered modulator signal that forms the input into the latch 102. The signal to be modulated onto $v_{signal}(t)$ is called $v_{jitter}(t)$ and may be generated by jitter transfer model 306.

The jitter may come from, for example, intersymbol interference, cross talk, and the like. Other jitter sources such as low frequency periodic jitter which may be caused by EMI should be generally included in a jitter source that generates produces a jitter signal Jitter_in.

The effects of Jitter_in on a clock and data recovery (CDR) retimer may be modelled by a simple transfer function governed by the below:

$$H(s) = 1 - H_2(s); \quad (4)$$

$$H_2(s) = \frac{2\zeta\omega_n s + \omega_n^2}{s^2 + 2\zeta\omega_n s + \omega_n^2}; \text{ and} \quad (5)$$

$$\omega_n = \omega_{3dB} \Big/ \sqrt{1 + 2\zeta^2 + \sqrt{(1+2\zeta^2)^2 + 1}}. \quad (6)$$

In the above, $\zeta$ is the dumping factor, $\omega_n$ is the natural frequency and $\omega_{2dB}$ is the 3 dB frequency (e.g., 15 MHz).

Replacing s with j ω in equations 4 and 5 will result in a real frequency H(j ω) table (see table 1 below) which represents $S_{21}(\omega)$ for single-ended and net and $S_{dd21}(w)$ for a differential net. Further, assuming a perfect terminal match condition and uni-directional transmission ($S_{11}(\omega) = S_{12}(\omega) = S_{22}(\omega) = 0$).

TABLE 1

| |
| --- |
| $S_{11}(\omega) = 0$ |
| $S_{12}(\omega) = 0$ |
| $S_{21}(\omega) = H(j\omega)$ |
| $S_{22}(\omega) = 0$ |

For simplicity, only single-ended net is shown above. Of course, if a mixed mode signal is being considered, a single-ended-mode to mixed-mode transformer can be used to transform the mixed-mode with differential-mode and zero common-mode to single-ended-mode. Such a transformer is disclosed in U.S. patent application Ser. No. 15/047,002, entitled A SINGLE-ENDED-MODE TO MIXED-MODE TRANSFORMER SPICE CIRCUIT MODEL FOR HIGH-SPEED SYSTEM SIGNAL INTEGRITY SIMULATIONS filed on even date herewith and the contents of which are hereby incorporated by reference.

Utilizing the inputs of Table 1, the result is a SPICE behavioral circuit model by an S-parameter-to-SPICE circuit converter (e.g., jitter transfer model 306). In this example, the output of the transfer model 306 is $v_{jitter}(t)$.

Figure 4:
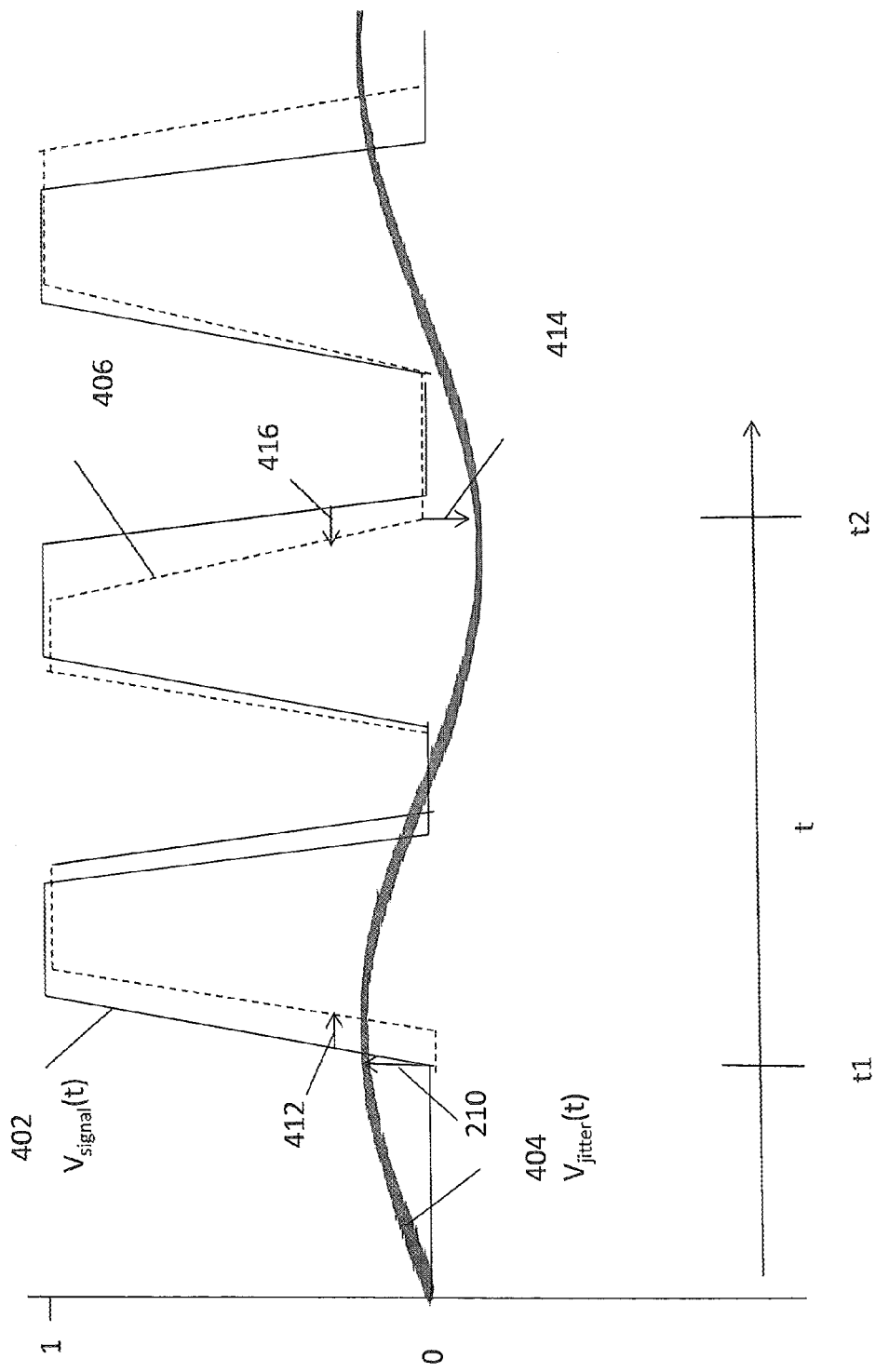
FIG. 4 is graph showing the operation of a jitter modulator.

In FIG. 4, the output ($v_{jitter}(t)$) of the jitter transfer model function 306 is shown by trace 404. The particular shape of the trace 404 is not limited to that shown in FIG. 4 and can be any shape. The "value" on the vertical axis related trace 404 represents the amount that jitter may cause the signal $v_{signal}(t)$ to be altered. Trace 404 and 402 as shown both have voltage as their units on the x axis although the physical reality of trace 404 is the jitter with a time unit.

A more detailed explanation of how $v_{jitter}(t)$ can be modulated on $v_{signal}(t)$ is provided in Co-pending United States Patent Application entitled "BEHAVIOURAL CIRCUIT JITTER MODEL" having Ser. No. 15/047,011, the contents of which are incorporated herein by reference.

Herein the resulting modulated signal shall be referred to as $V_{jittered-signal}(t)$ or $v_{js}(t)$ for short. An example of $v_{js}(t)$ is shown as trace 406 in FIG. 2. For purposes of understanding, a step wise discussion of how $v_{js}(t)$ may be formed from traces 402 and 404 is provided.

As discussed above, trace 404 provides, for each time (t), a value in units of time that the jitter will cause trace 402 to be shifted. The shift can be either positive or negative depending on whether the amplitude of trace 404 is greater or less than zero. As such, the discussion below will account for negative shifting as will be understood by the skilled artisan based on the disclosure herein.

At a first time (t1) the value of 404 indicates that trace 402 should be shifted to the right by a time that is equal in magnitude to arrow 410. This shift is shown by arrow 412 and the resultant shifted signal is shown by trace 406 in FIG. 2. However, it shall be understood that a conversion factor (C) may be needed to convert from the voltage represented by arrow 412 to a time. To that end, the amplitude of trace 404 may be converted to units of time by multiplying by C where C, in one embodiment, has units of s/V and in a particular embodiment has units of 1 ns/V. It shall be understood that the shifted signal is not shifted the same amount as indicated by arrow 412 at all points but may be shifted different amounts depending on the magnitude of trace 404 at any given time. For instance, at time t2, trace 404 indicates that trace 402 should be shifted to the left (e.g., trace 404 has a negative time value) as indicated by arrows 414 and 416. It shall be understood that at each possible time, the same process may be repeated to cause the effects of $v_{jitter}(t)$ to be applied to $V_{signal}(t)$ to form $v_{js}(t)$.

With reference back to FIG. 3, $v_{js}(t)$ is supplied as an input to the latch 102 and $v_{out}(t)$ is formed therefrom as described above.

Figure 5:
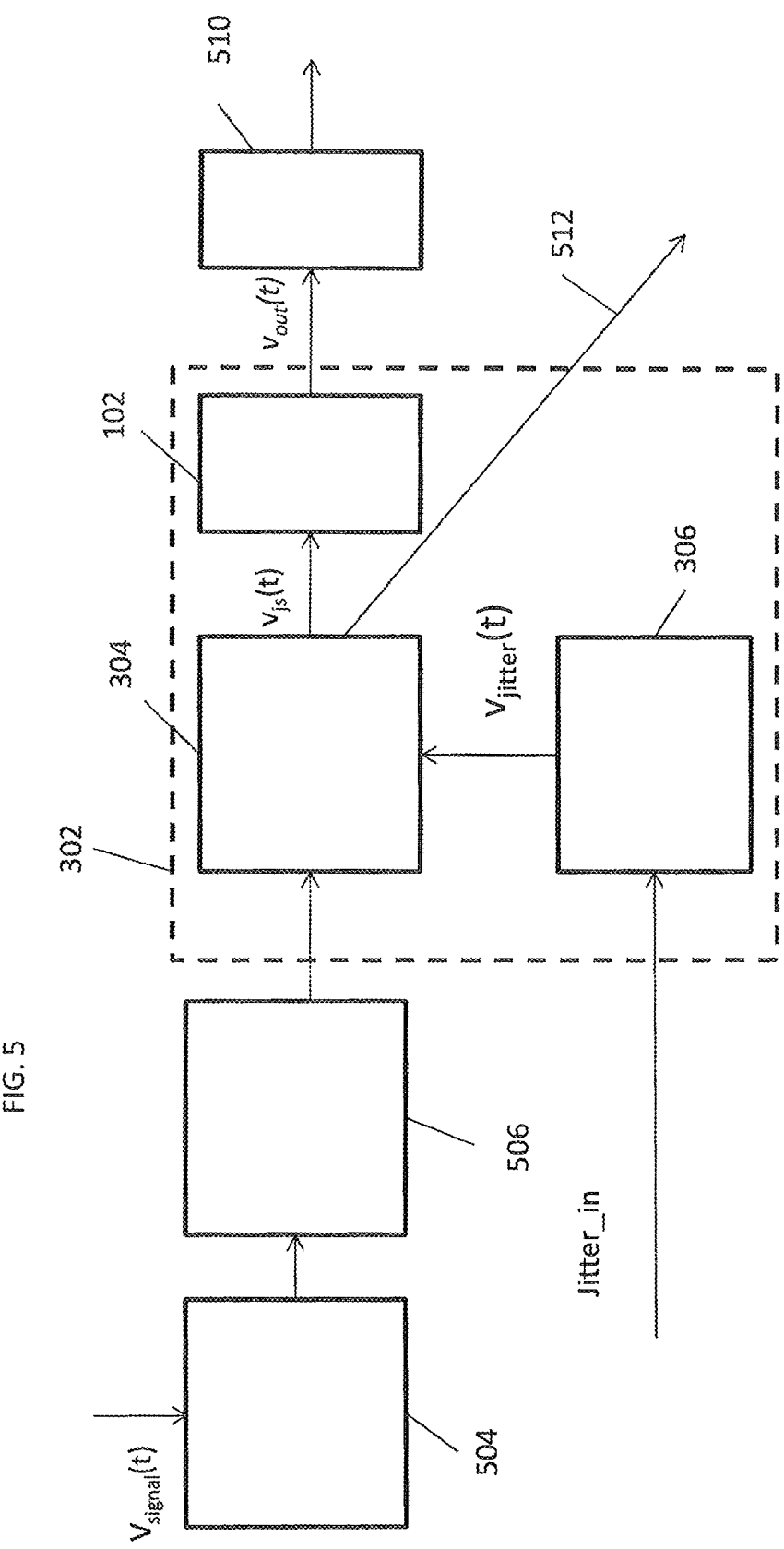
FIG. 5 is block diagram of a retimer model according to another embodiment.

FIG. 5 illustrates another embodiment of a retimer model 502. This model includes the model 302 described above and includes optional elements as well. In particular, this model includes an optional continuous time linear equalization (CTLE) model 504 and an optional decision feedback equalization (DFE) model 506. These models are known and will be utilized if the retimer includes one or both of these. $v_{signal}(t)$ is fed to one or both of these models before being provided to jitter modulator 304. The output of data latch 102 may be provided to an optional preemphasis model 510. Such models are known in the art. Further, in one embodiment, the jitter modulator 304 may include another output (eye output 512) that provides a second version of $v_{js}(t)$ such that an eye diagram may be formed. This output 512 may be included when modeling retimers that include such an output.

The above description has included information related to how simulation models may be used. It shall be understood that the models may be used in the process of circuit design. That design may include forming an initial circuit design and then testing that design. The testing may including utilizing any of the circuits or circuit models disclosed herein. The results of the test may then be analyzed, either manually or automatically or by combination of both, to determine if the circuit "passed." This may include considering whether certain tolerances were exceeded. This may be done by, for example, comparing a threshold value to one or more of the outputs. For example, if certain timing requirements are not met or the circuit is too susceptible to cross-talk or jitter may determine if the circuit passed. In the event that the circuit does not pass, one or more of the circuit parameters may be changed and, in what turn out to be a repetitive cycle, the circuit is again tested. This may allow for circuit problems to be discovered and corrected before fabrication. Thus, in one embodiment, a method of forming a circuit is disclosed that includes forming and testing a first circuit model, changing the first circuit model to a second circuit model, optionally testing the second circuit model and providing the second circuit model to a production system or operation to create a physical circuit from some or all of the second circuit model.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of analyzing a transient response of an electronic circuit, the method comprising:
    forming a model of a retimer, the model including a data clocked latch that includes an input and an output, the input being coupled to ground through an input impedance and the output including a voltage controlled voltage source having positive and negative terminals, the negative terminal being coupled to ground through an output impedance and the positive terminal being connected to the output;
    providing a latch input signal at the input;
    forming an output signal based on the latch input signal with the voltage controlled voltage source, wherein the voltage controlled voltage source provides a high output when the latch input signal passes through a low to high transition value and continues to provide the high output until the latch input signal passes through a high to low transition value; and
    fabricating the electronic circuit.

2. The method of claim 1, wherein the low to high transition value is greater than the high to low transition value.

3. The method of claim 2, wherein the high value Vmax and the low value is 0, where Vmax is selected by a user.

4. The method of claim 1, wherein the voltage controlled voltage source generates a voltage that is based on the maximum of a first parameter and a second parameter.

5. The method of claim 4, wherein the first parameter is $P_1(t)$ and the second parameter is $1-P_2(t)$ and wherein:

$$P_1(t)=(k1+k2*SGN(v_{in}(t)-V_{shh2l}))*(1-P_2(t));$$

$$P_2(t)=k1+k2*SGN(V_{shl2h}-v_{in}(t));$$

and k1 and k2 are constants.

6. The method of claim 1, further comprising:
    modulating a jitter signal onto an input signal to form the latch input signal.

7. The method of claim 1, further comprising:
    forming the jitter signal with a jitter transfer model.

8. The method of claim 1, wherein the input signal is formed by applying one or both of a continuous time linear equalization (CTLE) model and a decision feedback equalization (DFE) model to an initial signal.

9. A computer program product comprising a non-transitory computer readable storage medium having program instructions embodied therewith, the program instructions executable by a processor chip to cause the processor chip to analyze a transient response of an electronic circuit by:
    forming a model of a retimer, the model including a data clocked latch that includes an input and an output, the input being coupled to ground through an input impedance and the output including a voltage controlled voltage source having positive and negative terminals, the negative terminal being coupled to ground through an output impedance and the positive terminal being connected to the output;
    providing a latch input signal at the input;
    forming an output signal based on the latch input signal with the voltage controlled voltage source, wherein the voltage controlled voltage source provides a high output when the latch input signal passes through a low to high transition value and continues to provide the high output until the latch input signal passes through a high to low transition value; and
    fabricating the electronic circuit.

10. The computer program product of claim 9, wherein the low to high transition value is greater than the high to low transition value.

11. The computer program product of claim 10, wherein the high value Vmax and the low value is 0, where Vmax is selected by a user.

12. The computer program product of claim 9, wherein the voltage controlled voltage source generates a voltage that is based on the maximum of a first parameter and a second parameter.

13. The computer program product of claim 12, wherein the first parameter is $P_1(t)$ and the second parameter is $1-P_2(t)$ and wherein:

$$P_1(t)=(k1+k2*SGN(v_{in}(t)-V_{shh2l}))*(1-P_2(t));$$

$$P_2(t)=k1+k2*SGN(V_{shl2h}-v_{in}(t));$$

and k1 and k2 are constants.

14. The computer program product of claim 9, further comprising:
    modulating a jitter signal onto an input signal to form the latch input signal.

15. The computer program product of claim 14, further comprising:
    forming the jitter signal with a jitter transfer model.

16. The computer program product of claim 9, wherein the input signal is formed by applying one or both of a continuous time linear equalization (CTLE) model and a decision feedback equalization (DFE) model to an initial signal.

17. A system for analyzing a circuit comprising:
a signal source; and
a model of a retimer, the model including a data clocked latch that includes an input connected to the signal source and an output, the input coupling the signal source to ground through an input impedance and the output including a voltage controlled voltage source having positive and negative terminals, the negative terminal being coupled to ground through an output impedance and the positive terminal being connected to the output;
wherein the model forms an output signal based on the signal source with the voltage controlled voltage source, wherein the voltage controlled voltage source provides a high output when the latch a signal received from the signal source passes through a low to high transition value and continues to provide the high output until the latch input signal passes through a high to low transition value,
wherein the circuit is formed based on the model.

18. The system of claim 17, wherein the voltage controlled voltage source generates a voltage that is based on the maximum of a first parameter and a second parameter, wherein the first parameter is $P_1(t)$ and the second parameter is $1-P_2(t)$ and wherein:

$$P_1(t)=(k1+k2*SGN(v_{in}(t)-V_{shh2l}))*(1-P_2(t));$$

$$P_2(t)=k1+k2*SGN(V_{shl2h}-v_{in}(t))$$

and k1 and k2 are constants.

19. The system of claim 17, wherein the low to high transition value is greater than the high to low transition value.

20. The system of claim 19, wherein the high value is Vmax and the low value is 0, where Vmax is selected by a user.

* * * * *